US011227242B2

(12) United States Patent
Smith et al.

(10) Patent No.: US 11,227,242 B2
(45) Date of Patent: Jan. 18, 2022

(54) SYSTEM AND METHOD FOR AUTOMATICALLY TRIGGERING INCIDENT INTERVENTION

(71) Applicant: Caterpillar Inc., Deerfield, IL (US)

(72) Inventors: Nigel Graham Smith, Peoria, IL (US); David James Edwards, Dunlap, IL (US); Michael K. Hatfield, Morton, IL (US); Elisa Beth Begner, Elmwood, IL (US)

(73) Assignee: Caterpillar Inc., Peoria, IL (US)

( * ) Notice: Subject to any disclaimer, the term of this patent is extended or adjusted under 35 U.S.C. 154(b) by 141 days.

(21) Appl. No.: 16/115,108

(22) Filed: Aug. 28, 2018

(65) Prior Publication Data

US 2020/0074383 A1    Mar. 5, 2020

(51) Int. Cl.
| | | |
|---|---|---|
| *G06Q 10/00* | (2012.01) | |
| *G06Q 10/06* | (2012.01) | |
| *G01D 21/02* | (2006.01) | |
| *G08G 1/00* | (2006.01) | |
| G05D 1/02 | (2020.01) | |

(52) U.S. Cl.
CPC ..... *G06Q 10/063114* (2013.01); *G01D 21/02* (2013.01); *G06Q 10/06316* (2013.01); *G08G 1/20* (2013.01); G05D 1/0276 (2013.01)

(58) Field of Classification Search
CPC ..... G06Q 10/063114; G06Q 10/06316; G01D 21/02; G08G 1/20; H04W 4/023; F16P 3/14
USPC ...................................................... 705/7.15
See application file for complete search history.

(56) References Cited

U.S. PATENT DOCUMENTS

| | | | |
|---|---|---|---|
| 9,466,038 B2* | 10/2016 | Kezeu | ................. G06Q 50/265 |
| 2014/0184643 A1 | 7/2014 | Friend | |
| 2015/0343947 A1* | 12/2015 | Bernico | ............. G08G 1/0141 |
| | | | 340/436 |
| 2016/0257310 A1 | 9/2016 | Sprock et al. | |
| 2017/0132884 A1* | 5/2017 | Kumar | ..................... G08B 5/22 |
| 2017/0147958 A1* | 5/2017 | Hatfield | ......... G06Q 10/063114 |
| 2017/0193379 A1* | 7/2017 | Garnavi | .............. G06Q 50/265 |
| 2017/0193787 A1 | 7/2017 | Devdas et al. | |

(Continued)

FOREIGN PATENT DOCUMENTS

| | | |
|---|---|---|
| WO | 2016160896 | 10/2016 |
| WO | 2017201053 | 11/2017 |

*Primary Examiner* — Rutao Wu
*Assistant Examiner* — Tyrone E Singletary
(74) *Attorney, Agent, or Firm* — Harrity & Harrity LLP

(57) ABSTRACT

A method includes determining, based at least in part on sensor data about a worksite, first and second conditions associated with a location at the worksite. The method also includes determining, based at least in part on the first condition and the second condition, a first risk factor associated with a first portion of the worksite, the first portion including the location and area proximate the location and determining a second risk factor associated with a second portion of the worksite adjacent the first portion. The method may also include generating a graphical user interface comprising a graphical representation of the first portion of the worksite and the second portion of the worksite and visual indications of the risk factors. Further aspects may include controlling machines and/or electronic devices at the worksite when a value associated with the risk factors is greater than a threshold value.

20 Claims, 7 Drawing Sheets

(56) References Cited

U.S. PATENT DOCUMENTS

| | | | |
|---|---|---|---|
| 2017/0248949 A1* | 8/2017 | Moran | G08G 1/165 |
| 2017/0254050 A1 | 9/2017 | Wright | |
| 2017/0352242 A1* | 12/2017 | Glynn | G08B 21/0469 |
| 2020/0004938 A1* | 1/2020 | Brannon | G06F 21/316 |
| 2020/0273268 A1* | 8/2020 | Bhattacharyya | H04L 12/40169 |

* cited by examiner

SYSTEM AND METHOD FOR AUTOMATICALLY TRIGGERING INCIDENT INTERVENTION

TECHNICAL FIELD

This disclosure relates generally to controlling machines at worksites such as construction, industrial, and/or mining sites, and, more specifically, to systems utilizing sensors and data processing techniques to identify incidents and/or intervene in such incidents through machine control.

BACKGROUND

Many industrial worksites include machines, equipment, and/or personnel to perform various functions. For example, a mining site may include excavators, haul trucks, and operators to mine ore or other resources and dispose of waste. The operations of such machines and personnel must be coordinated in order to maintain efficiency at the site. However, efficiency may be undermined by accidents at the worksite, because such accidents may result in machine downtime, worker injury, or the like. Accordingly, it may be useful to monitor conditions and/or events at the worksite, and take action to prevent incidents based on such monitoring, thereby improving safety at the worksite. Moreover, such monitoring and incident prevention may be useful in several different geographical areas, beyond industrial worksites.

An example system for improving safety at a worksite is described in U.S. Patent Application Publication No. 2017/0352242 (hereinafter referred to as the '242 reference). In particular, the '242 reference describes a safety device that is worn by a worker in a manufacturing facility. The device described in the '242 reference may include a number of sensors that sense environmental conditions around the worker and that tracks the position of the worker. As explained in the '242 reference, the safety device may also include an event trigger that the worker can activate when a notable event or a near miss occurs. The environmental data and the events/misses may be stored in a database for purposes of predicting future accidents. The '242 reference does not, however, disclose details related to utilizing a network of sensors and communication devices at a worksite to determine risk factors for the worksite and/or automatically intervening to mitigate risks. The '242 reference also does not disclose an interactive system that supports identification of risks and remote intervention to mitigate those risks. As a result, incidents such as accidents or equipment failure may not be prevented by the techniques described in the '242 reference.

Example embodiments of the present disclosure are directed toward overcoming the deficiencies described above.

SUMMARY

In an aspect of the present disclosure, a method includes receiving first data captured by a first sensor at a worksite and receiving second data captured by a second sensor at the worksite. The first data is indicative of a first condition at a location at the worksite at a first time, and the second data is indicative of a second condition proximate the location at the first time. The example method may also include, based at least in part on the first data and the second data, determining a risk factor associated with the location, and generating a first graphical user interface configured for display on a user device. The first graphical user interface may include a graphical representation of the worksite, a visual indication of the risk factor at a position on the graphical representation, the position corresponding to the location at the worksite, and a first user interface element associated with at least one of the risk factor or the location. The example method may also include receiving a first user input indicative of a user selection of the first user interface element, and based at least in part on the first user input, generating a second graphical user interface configured for display on the user device. The second graphical user interface may include additional information about the at least one of the risk factor or the location, the additional information including a second user interface element associated with an action for mitigating a risk associated with the risk factor. The example method may also include receiving a second user input indicative of a user selection of the second user interface element, and based at least in part on the second selection information, causing the action to be performed.

In another aspect of the present disclosure, a system includes one or more processors; and memory storing processor-executable instructions that, when executed by the one or more processors, configure the system to perform acts. The acts may include receiving first data captured by a first sensor at a geographic area, the first data being indicative of a first condition at a location at the geographic area at a time, and receiving second data captured by a second sensor at the geographic area, the second data being indicative of a second condition proximate the location substantially at the time. The acts may further include, based at least in part on the first data and the second data, determining a risk factor associated with the location and generating a graphical user interface. The graphical user interface may include a graphical representation of the geographic area, a visual indication of a value associated with the risk factor at a position on the graphical representation corresponding to the location, and a user interface element associated with at least one of the risk factor or the location. The graphical user interface is configured for display on a user device.

In yet another aspect of the present disclosure, a system includes one or more processors and memory storing processor-executable instructions that, when executed by the one or more processors, configure the system to perform acts. The acts may include receiving sensor data associated with a worksite, determining, based at least in part on the sensor data, a first condition associated with a location at the worksite, and determining, based at least in part on the sensor data, a second condition proximate the location. The acts may further include determining, based at least in part on the first condition and the second condition, a first risk factor associated with a first portion of the worksite, the first portion including the location and area proximate the location, and determining, based at least in part on the sensor information, a second risk factor associated with a second portion of the worksite adjacent the first portion. The acts may also include generating a graphical user interface comprising a graphical representation of the first portion of the worksite and the second portion of the worksite, a visual indication of a first value indicative of the first risk factor positioned in the graphical user interface in association with the first portion, a visual indication of a second value indicative of the second risk factor positioned in the GUI in association with the second portion, a first user interface element associated with at least one of the first value or the first portion, and a second user interface element associated with at least one of the second value or the second portion.

The graphical user interface is configured for display on a user device. The example acts may also include, in response to receiving a user selection of the first user interface element, generating an updated graphical user interface including information about at least one of the first condition or the second condition, the updated graphical user interface being configured for display on the user device.

DETAILED DESCRIPTION

Figure 1:
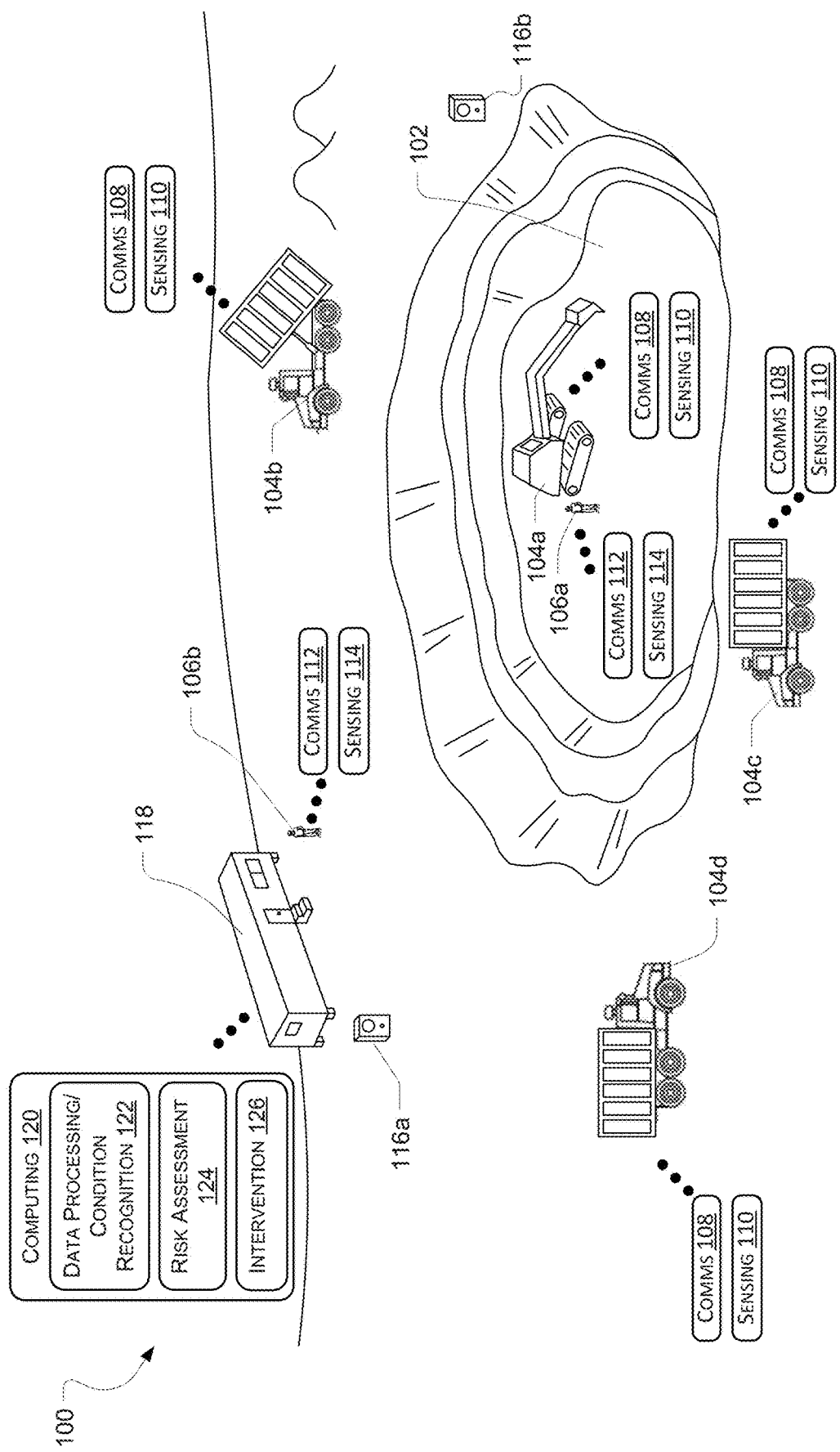
FIG. 1 is a perspective view of a worksite in accordance with an example embodiment of the present disclosure.

This disclosure generally relates to the sensing, coordination, and/or control of machines and personnel to increase safety and reduce incidents, such as accidents or injuries, in a geographical area, such as a worksite. Wherever possible, the same reference numbers will be used through the drawings to refer to the same or like features. Referring to FIG. 1, an example worksite 100 may be a mining location at which a number of operations are being performed. For example, the worksite 100 may include an open-pit mine 102 from which ore and/or other materials may be extracted. Additional or alternative operations (not illustrated) performed at the site may include, but are not limited to, tunnel mining, blasting, and/or other mining or landscaping operations. Although such operations are particularly suited to mining, aspects of this disclosure may apply to geographic areas and worksites other than a mining site. For example, and without limitation, aspects described herein may be applicable to many geographic locales at which coordinated activities are carried out. In some instances, the worksite 100 may be an industrial site, a factory floor, a building construction site, a road construction site, a quarry, a building, a city, or the like. Moreover, features of the worksite may change over time, e.g., as the worksite 100 develops.

A number of machines may also be present at the worksite 100. For instance, FIG. 1 illustrates an excavator 104a in the open pit mine 102 and trucks 104b, 104c, 104d performing various hauling and dumping operations throughout the worksite 100. The excavator 104a and the trucks 104b-104d are only examples. Other machines, including but not limited to earth-moving machines, e.g., wheel loaders, dump trucks, backhoes, bulldozers, or material handlers, tankers, e.g., for carrying water or fuel, over-the-road vehicles, work machines, e.g., pavers or compactors, or the like also or alternatively may be present at the worksite 100. Moreover, while these and other example machines may be present at the mining worksite 100, other worksites may require different machines. As used herein, the term "machine" may refer to any type of machine that performs some operation associated with an industry such as mining, construction, farming, transportation, oil and gas, manufacturing, or any other industry. Throughout this disclosure, one or more machines, including but not limited to the excavator 104a and the trucks 104b, 104c, 104d, will be referred to as "the machines 104."

In some implementations, the worksite 100 may be substantially completely autonomous. However, in the illustrated embodiment, people or personnel 106a, 106b may also be present. For example, the personnel 106a may be a worker or operator in the open-pit mine 102 and the personnel 106b may be a supervisor or foreman overseeing operations at the worksite 100. Although only two personnel 106-1, 106-2 are illustrated, additional personnel may also be present at the worksite 100. Moreover, although example tasks or jobs may be ascribed to the personnel 106 for purposes of examples, herein, such are examples only. In implementations described herein, personnel may be performing manual labor, operating the machines 104, overseeing operations, including operation of the machines 104, visiting the worksite 100, and/or performing other tasks.

One or more of the machines 104 may be configured with or otherwise have access to one or more communication components 108 and/or one or more sensing components 110. Moreover, one or more of the personnel may have an accompanying one or more communication components 112 and/or one or more sensing components 114. For example, the communication components 108, 112 may include a transmitter/receiver, including an antenna, to facilitate wireless communication, e.g., via radio frequency (RF) signals, via a wireless network, such as a local area network (LAN) or a wide-area network (WAN), or any other communication protocol. The communication components 108 may be configured to communicate with a central hub, e.g., at a fixed location, with the central hub being configured to receive all or substantially all communications and route the communications as appropriate. In other implementations, the communication components 108 may be configured to communicate directly with each other, e.g., via a distributed network. Hybrid networks and/or different communication networks and protocols may alternatively be used; this disclosure is not dependent upon a single arrangement, technology or protocol. The communication components 108, 112 may also include a speaker and/or a microphone to facilitate verbal communication and/or a text input device, e.g., a keypad or touchscreen, to facilitate textual communication. By way of non-limiting example, the communication components 108 may include one or more radios accessible in the machine 104, a speaker system in the machine 104, one or more microphones disposed in the machine 104, a touch screen in the machine 104, or the like. Moreover, the communication components 112 may include a radio, mobile phone, tablet device, headset, or other electronic device associated with the personnel 106 and that facilitates communication with the personnel 106.

The sensing components 110 may be any number of sensor modalities affixed to or otherwise associated with the machines 104. By way of non-limiting example, the sensing components 110 may include location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), LIDAR sensors, RADAR sensors, ultrasonic transducers, SONAR sensors, etc. Moreover, the sensing components 110 may be configured to sense conditions external to or internal of (e.g. in a cab of) the machine 104 of which they are associated. By way of non-limiting example, the sensing components 110 may include cameras trained on an exterior of the machine, e.g., to record video and/or images of an environment of the machine 104 and/or cameras trained on an interior of the machine 104, e.g., to record video and/or images of an operator of the machine 104. In further examples, the sensing components 110 may also include wear sensors, e.g., to sense wear of components associated with the machines. The sensing components 110 may also include safety-related sensors. For example, seat belt sensors may generate information indicative of whether a seat belt is being used. Similarly, other sensors may generate information indicative of proper use of other safety features. In addition to different types of sensors, the sensing components 110 may also include multiple sensors of the same type. For example, a plurality of microphones, cameras, or LiDAR sensors may be disposed at different locations on the machine 104, e.g., to provide information about different portions of the environment of the machine 104.

Similarly, the sensing components 114 may include any number of sensor modalities associated with the personnel 106. By way of non-limiting example, the sensing components 114 may include location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, environment sensors (e.g., temperature sensors, humidity sensors, light sensors, pressure sensors, etc.). The sensing components 114 may also include sensors for measuring attributes of the personnel, e.g., heart rate, blood pressure, calorie expenditure, distance travelled, and the like. Moreover, the sensing components 114 may include safety-related sensors that generate information about whether the personnel is complying with safety regulations. For example, the sensing components 114 may include a sensor integrated into a helmet that indicates whether the helmet is worn and/or worn properly and/or a sensor associated with a harness or other safety device used by the personnel 106. In some examples, the sensing components 114 may be integrated into one or more electronic devices associated with the personnel 106, including but not limited to a device worn by the personnel 106, e.g. a head-mounted device, a wrist-mounted device, or the like, or a device carried by the personnel, e.g., a smart phone, a radio, a tablet, a fob, or the like.

Moreover, in addition to the sensing components 110 associated with the machines 104 and the sensing components 114 associated with the personnel 106, additional sensors may also be disposed at the worksite 100. For example, additional sensors 116a, 116b (collectively, and when referring to additional and/or alternative sensors not associated with a machine 104 and/or personnel 106, the "additional sensors 116" or "sensors 116") also are illustrated in FIG. 1. For example, the sensors 116 may include one or more sensor modalities, e.g., a motion sensor, a camera, a position sensor, a microphone, a LiDAR sensor, a radar sensor, and/or the like, to surveille conditions at the worksite 100. In the example implementation of FIG. 1, the additional sensor 116a may be associated with a workstation 118, e.g., to sense conditions at or proximate the workstation, and the additional sensor 116b may be arranged proximate the open-pit mine 102, e.g., to sense conditions at or proximate the mine 102. In some examples, the sensors 116 can be placed at locations throughout the worksite 100 to provide additional information about aspects of the worksite 100. In some implementations, the sensors 106 may be disposed to sense conditions at locations that may be of importance and/or may be particularly susceptible to incidents. The additional sensors 116 may be associated with other elements, including potentially hazardous elements, at the worksite 100. By way of non-limiting example, the additional sensors 116 may be associated with high voltage sources, transformers, pressurized containers, fuel storage, radiation sources, hazard material sites, chemical storage, or the like.

As noted above, the worksite 100 may also include a workstation 118, which may be a room, building, vehicle, or the like, in which one or more of the personnel 108 may be situated. For example, the workstation 118 may contain one or more offices in which a supervisor, a foreman, and/or different personnel may be stationed. In some implementations, the workstation 118 may be act as a hub, for example, serving as a location at which the various machines and personnel are directed or otherwise controlled. To this end, the workstation 118 may include one or more computing systems 120 configured to implement processes described herein. For instance, the computing systems 112 may be configured to receive information from one or more the sensing components 110, 114 and/or the sensors 116. As will be appreciated from the foregoing, the worksite 100 may include a number of sensors, at a number of locations, to generate varied types of sensor data. Some of these sensors are conventionally in use at worksites such as the worksite 100, but often for discrete purposes. For example, in-cab cameras may be used to detect fatigue of users and wear sensors may be used to detect wear of components on machines. However, and as described further herein, in implementations of this disclosure the computing system 120 may receive data from the various sensing components 110, 114 and/or the sensors 116, determine risks associated with locations or regions of the worksite 100, e.g., based on combinations of conditions, and intervene, e.g., by controlling the machines 104.

More specifically, FIG. 1 schematically illustrates that the computing system 120 may include a data processing/condition recognition component 122. In examples described herein, the data processing/condition recognition component 122 may analyze sensor data to determine conditions at the worksite. As used herein, a "condition" may refer to an attribute, a state, or a fact about a machine, personnel and/or the worksite generally. For example, the data processing/condition recognition component 122 may glean from the sensing components 110 associated with the machines 104, conditions including locations of the respective machines 104, current states of the machines 104 (e.g., idle, dumping, excavating) or other conditions. The data processing/condition recognition component 122 may also determine, e.g., from the sensing components 114, conditions of the personnel 106, including but not limited to a position and/or state of the personnel 106. The data processing/condition recognition component 122 may also determine environment conditions, e.g., temperature, precipitation, or the like, from the additional sensors 116. The data processing/condition recognition component 122 may also analyze received data to determine aforementioned or additional conditions. For example, the data processing/condition recognition component 122 may analyze video or image data to determine a presence and/or identity of personnel at the worksite. For example, if the personnel 106b does not have an associated position sensor the data processing/condition recognition component 122 may identify her position and/or identity from video footage captured by a camera associated with the additional sensor 116a. In still further examples, the data processing/condition recognition component 122 may also access information about conditions. For example, upon determining an identify of a machine 104 or personnel 106, the data processing/condition recognition component 122 may access one or more databases storing information about the machine 104, e.g., maintenance history, specification, usage history, and the like, and/or about the personnel 106, e.g., training history, qualifications, and the like. Other example conditions, and methods for determining such conditions, are described further herein.

As also illustrated, the computing system 120 may include a risk assessment component 124. The risk assessment component 124 may include functionality that determines a metric, such as a risk factor, associated with regions of the worksite 100. As used herein, the term "risk factor" may refer to a score, value, or other metric associated with a likelihood or probability of occurrence of an incident. As also used herein, the term "incident" may refer to an accident, machine failure, or other occurrence that may result in injury, loss, or other physical, productivity, or economic harm. In some implementations, the risk assessment component may consider several conditions at a location or region in the worksite 100 and determine the risk factor based on the several conditions. Accordingly, different geographic locations within the worksite may have different risk factors. In one brief example, described in more detail herein, the risk assessment component 124 may determine a relatively high risk factor for an area proximate the excavator 104a, e.g., because the personnel 106a proximate the excavator the personnel 106a may have limited experience with the excavator 104a, the personnel 106a may not be wearing proper safety attire (such as a helmet or other protective gear), and it may be raining. While any one of these conditions may not individually have a high risk factor, the combination of conditions may result in a high risk factor. Other regions, e.g., proximate other of the machines 104, may also have elevated risk factors based on conditions proximate associated with and/or proximate those machines. As further described with respect to FIG. 4, below, the risk assessment component 124 may be a machine-learning model, e.g., including a neural network, that identifies likelihoods of incidents based on previous incidents and conditions preceding those previous incidents.

The computing system 120 may also include an intervention component 126. As described further herein, the intervention component 126 may include functionality that controls one or more devices, e.g., the machines 104 and/or devices associated with the personnel 106, to mitigate risks. For example, when a value associated with a risk factor meets or exceeds a threshold value, the intervention component 126 may determine one or more courses of action for reducing the risk factor, e.g., by altering a condition, and controlling one or more devices to implement such courses of action. In the example introduced above, should a value associated with the risk factor associated with the region proximate the excavator 104a exceed a threshold value the intervention component 126 may automatically disable or otherwise limit operation of the excavator 104a, for example. In other implementations, the intervention component 126 may determine actions and enable a user to instruct that such actions be taken, e.g., via interaction with a graphical user interface.

Figure 2:
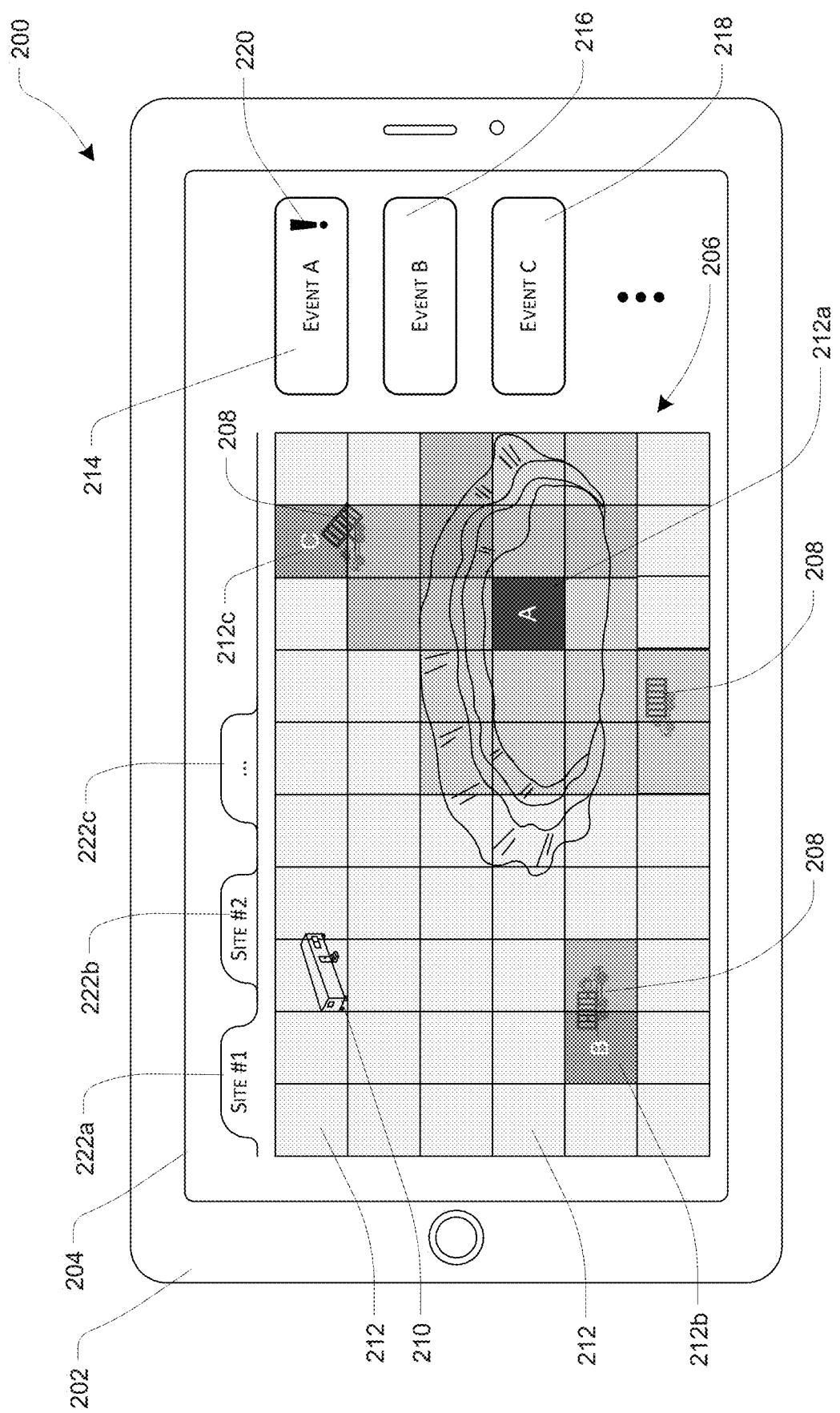
FIG. 2 is a schematic representation of a graphical user interface including a graphical representation of the worksite and risks associated with the worksite in accordance with an example embodiment of the present disclosure.

FIG. 2 is a schematic representation of an example graphical user interface 200. More specifically, FIG. 2 illustrates a user device 202 having a display 204. The user device 202 is illustrated as a handheld device, such as a tablet device, although in other implementations, the user device may be any number of electronic devices, e.g., a desktop computer, a laptop computer, a smart phone, including a display and facilitating user interaction with the display 204. The display 204 is configured to display or otherwise render the graphical user interface 200. In the example illustrated, the graphical user interface 200 includes a map 206 including features of the worksite 100. For example, the map 206 may illustrate topographical features such as of the open pit mine 102. The map 206 may also include graphical representations including but not limited to machine representations 208 (e.g., of the machines 104) and/or building representations 210 (e.g., of the work station 118). Although not shown in FIG. 2, the map 206 may graphically depict any additional or other features of the worksite 102. For example, the map 206 may include graphical depictions of personnel at the worksite (e.g., the personnel 106), of sensing devices located at the worksite (e.g., representations of the sensing device(s) 116), other topographical features, such as roads, elevation changes, bodies of water, or the like, and any other structures or features at or near the worksite 100. Also by way of non-limiting examples, the map 206 may show hazards or potential hazards at the site, including electrical loads, e.g., transformers, generators, or the like, hazardous materials, e.g., fuel tanks, chemical storage, radiation sources, or the like, and/or other static elements that could be of interest.

As also illustrated in FIG. 2, the map 206 may be partitioned into a number of regions 212. In the illustrated embodiment, each of the regions 212 is substantially equal in area. For example, each of the regions 212 may represent a predetermined area of the worksite 100. For instance, each of the regions 21 may approximate a 3 m×3 m section of worksite 100, although smaller or larger sizes are also contemplated. Moreover, although the regions 212 are illustrated as being substantially equal in size, they may have different sizes, shapes, or the like. The regions 212 are an example only and together, the regions 212 segment the worksite 102 into a grid of sections. Conditions and events determined according to implementations described herein may be associated with one or more regions 214, i.e., based on the location in the worksite 100 of the condition/event, and the regions 214 may be displayed in the graphical user interface 200 to depict information about the condition/event.

More specifically, and as illustrated in FIG. 2, the regions 214 may be designated separately, in a manner that illustrates or portrays a risk factor associated with each of the regions 214. In the illustrated embodiment, the regions 214 may be differently color-coded. In examples of this disclosure, the color coding may be used to visually indicate a risk factor, described herein, associated with different regions or locations of the worksite 100. In the example illustrated in FIG. 2, a first region 212a is designated by the letter A, a second region 212b is designated by the letter B, and a third region 212c is designated by the letter C. As also illustrated, the first region 212a is relatively darker than adjacent regions 212, the second region 212b be is relatively darker than regions 212 adjacent to it, and the region 212c is relatively darker than regions adjacent to it. Moreover, the region 212a is relatively darker than both the region 212b and the region 212c. Accordingly, a user viewing the display 204 may determine readily that event A, proximate the region 212a, has a higher risk factor than other regions 212 on the map. For example, the user may deduce that event A at the region 212 a should be investigated, because it may represent an unsafe event. Similarly, the user may readily determine that the second region 212b and the third region 212c have relatively elevated risk factors, e.g., relative to all regions 212 other than the first region 212a. The user may also determine that Event B and/or Event C, e.g., at the respective second and third regions 212b, 212c, may be problematic and should be investigated. As used herein, the term "event" may refer to a state or situation resulting from a plurality of conditions. Thus, for example, the event A may describe the presence of a plurality of conditions at the first region 212a, which, in the example introduced above in the discussion of FIG. 1, may include the presence of the excavator 104a, the presence of the personnel 106a, details about the excavator 104a, details about the personnel 106a, environmental conditions, and/or additional conditions.

Although FIG. 2 is provided in grayscale, it will be appreciated that other visual indicators may be used to identify events at the worksite 100. For example, the map 206 may be illustrated as a heat map, with critical regions such as the first region 212a, the second region 212b, and/or the region 214c shown in a different or brighter color than other regions with relatively lower risk factors. For instance, in a traditional heat map, the first region 214a may be shown in bright red, the second and third regions 214b, 214c may be shown in lighter red or yellow, and other regions 212, including regions that have no existing conditions or events, may be shown as green. Other color schemes will be appreciated by those having ordinary skill in the art. In other implementations, and although not illustrated, the graphical user interface 300 may also include a key to aid the user in understanding the coding scheme.

In still other examples, visual representations other than a heat map and/or color-coded schemes may be used. For example, a number or value corresponding to the risk factor may be presented in association with one or more of the regions 212. In other examples, the regions may include rankings, which may include letters like those associated with the regions 212a, 212b, 212c. Such ranking may be provided with or without the color scheme. As in the embodiment of FIG. 2, the letters may go in order of criticality, i.e., with A being the most critical, B being next, and so forth, although other ordering and/or ranking nomenclature could be used. By way of nonlimiting example, instead of the letters A, B, C, the graphical user interface 200 may include numbers. For example, the number "1" can be used in place of the A, number "2" in place of B and so forth. As noted above, only those regions having a risk factor above a predetermined threshold may be enumerated on the graphical user interface 200. Those having ordinary skill in the art will understand additional visual indications consistent with the disclosure herein.

Figure 3:
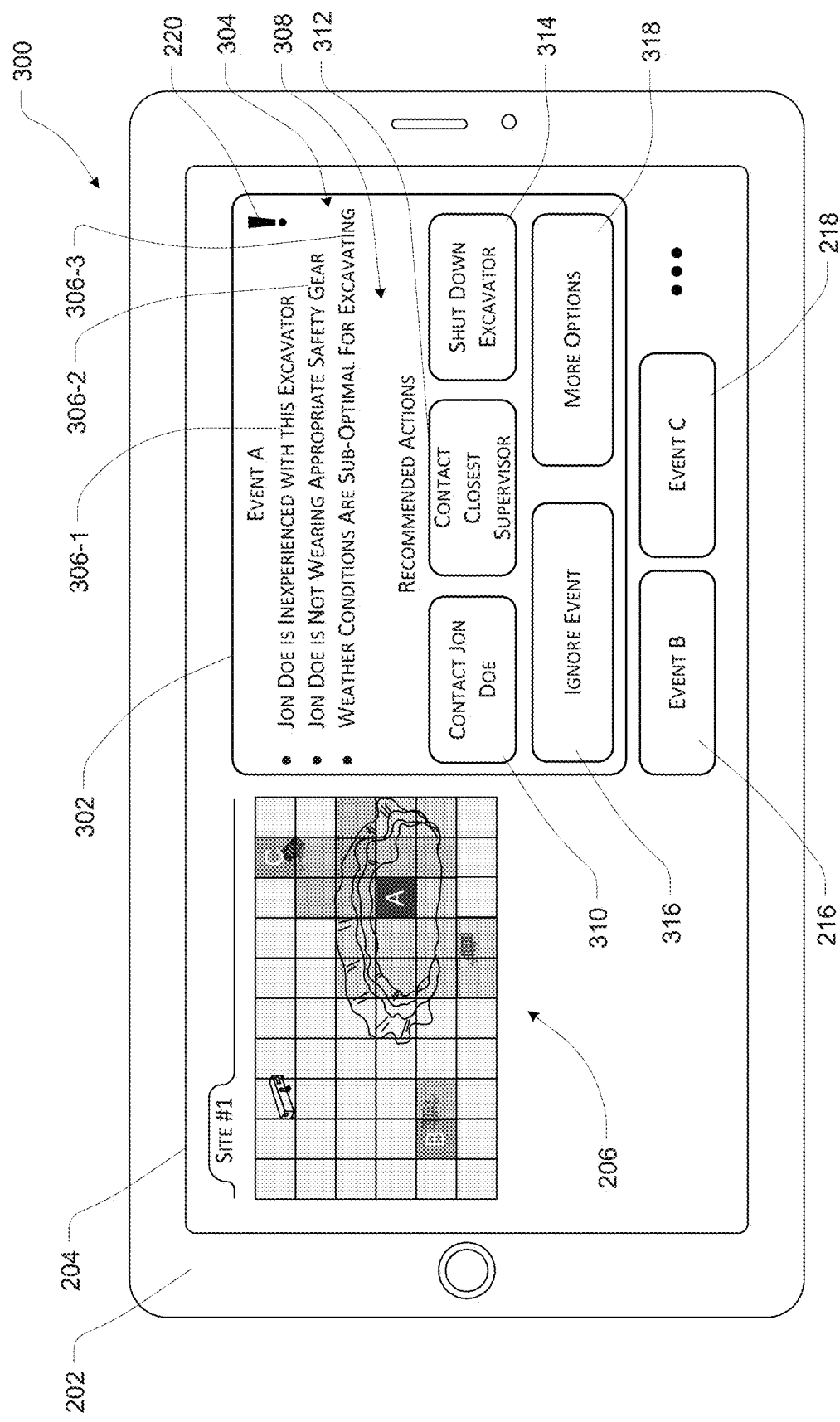
FIG. 3 is a schematic representation of another graphical user interface in accordance with another example embodiment of the present disclosure.

In addition to illustrating the risk factors at associated regions of the worksite 100, the graphical user interface 200 may also allow a user to interact with the graphical user interface 200. For example, and as illustrated in FIG. 2, the graphical user interface 200 may include user interface controls 214, 216, 218. In examples of this disclosure, the user interface controls 214, 216, 218 may be buttons or other designations on the display 204 of the device 202 via which a user may interact. For example, a user may interact with the user interface controls 214, 216, 218 by touching the display 204 at a position proximate the user interface control, by selecting the user interface control with a stylus or other selecting device associated with the user device 202, or otherwise. In the example of FIG. 2, a user may select the user interface control 214 to obtain more information about the event A illustrated as occurring in connection with the first region 212a. Similarly, the user may select or otherwise interact with the second user interface control 216 to gain additional information about the event B associated with the second region 212b. The user may select or otherwise interact with the third user interface control 218 to gain additional information about the event C associated with the third region 212c. For example, selection of any of the user interface controls 214, 216, 218 may cause the user device 202 to render an updated graphical user interface with additional information and enabling additional functionality. An example of an updated graphical user interface is illustrated in FIG. 3, which will be described in more detail below.

Continuing with the discussion of FIG. 2, the graphical user interface 200 may also include additional designations, such as a designation 220, which may indicate to the user that one of the determined events, in this example, Event A, is particularly critical. For example, the designation 220 may be displayed when a value of a risk factor is equal to or exceeds a threshold. Although the designation 220 is embodied as a stylized exclamation point in the illustration, other designations 220 may be used.

As described, the graphical user interface 200 includes the map 206 of the worksite 100. However, techniques described herein may be applicable to multiple, different worksites, and the graphical user interface 200 may also include controls for allowing a user to view other maps, e.g., of those other worksites. In the illustrated embodiment, the map 206 may be presented in association with a first tab 222a and other maps may be accessible via additional tabs. For example, a second map (not shown) may be accessible by selecting a second tab 222b. Other tabs, such as a third tab 222c may allow a user to view additional sites or locations. The tabs 222a, 222b, 222c are one example of an arrangement via which a user may view different maps; other arrangements also are contemplated. For example, the user may be able to access additional site maps from a list or other user interface tool.

Accordingly, the map 206 provides a graphical representation of the worksite 100 with representations of risk factors, e.g., to show regions of the worksite that may be at heightened risk of an incident, such as an accident or the like. In implementations, the map 206 may be interactive, e.g., by allowing the user to zoom in or out, pan linearly, or the like. In some example implementations, it is contemplated that a site manager, quality control personnel, foreman, or the like may access the user device 202 to oversee activity at the worksite 100.

As noted above, the user may be able to access additional information about the risk factors, e.g., by selecting the user interface elements 214, 216, 218. For example, FIG. 3 illustrates an updated graphical user interface 300 that may be presented on the display 204 in response to a user selecting the first user interface element 214. In other examples, the user may be able to access the updated graphical user interface 300 by selecting the region 212a on the map 206, by selecting the letter "A" on the map, and/or by selecting the designation 220. In other examples, the graphical user interface 300 may be otherwise accessed. In the illustrated example, the event A may correspond to the example introduced above in connection with FIG. 1. In that example, the personnel 106a and the excavator 104a are located in the open pit mine 102. For purposes of FIG. 3, the personnel 106a may have been identified as John Doe.

As illustrated in FIG. 3, in the graphical user interface 300, the map 206 may be reduced in size (or in some embodiments the map 206 may be removed altogether) to accommodate an expanded event information section 302. In the illustrated embodiment, the event information section 302 provides additional information relative to the event A. For example, in a first portion 304, the event information section 302 includes one or more indications or conditions in the associated region, the region 212b in this example, that have resulted in the risk factor score. The example first portion 304 includes a list with textual descriptions of three conditions, namely, "Jon Doe is inexperienced with this excavator" 306-1, "Jon Doe is not wearing appropriate safety gear" 306-2, and "weather conditions are sub-optimal for excavating" 306-3. These conditions are provided for example only, more or fewer and/or different conditions may be associated with the risk factor and any or all conditions considered in the risk factor determination may be provided in the first portion 304.

As described herein, each of the sensed conditions, e.g., the conditions represented by the textual descriptions 306-1, 306-2, 306-3, may be insufficient to trigger an alert, e.g., to result in an elevated risk factor, but the combination of conditions may be determined to be the reason for the high risk factor (and suggestion that some further investigation and/or action be taken). Thus, for example, the mere presence of Jon Doe near and/or operating the excavator 104a may not be particularly alarming, but the combination of Jon Doe near the excavator combined with his inappropriate or insufficient safety gear and the adverse weather, may suggest that an intervention is necessary. Similarly, the presence of adverse weather may not (and perhaps should not) preclude operation of the excavator 104a, but the adverse weather in combination with Jon Doe being the operator and Jon Doe not having adequate safety gear may result in a higher value of the risk factor. For example, only the confluence of the three events may be enough to raise the risk factor to a value that indicates a critical event (event A).

The event information section 302 may also include a second portion 308 providing user interface elements via which a user may intervene in the event. For instance, a first user interface element 310 may include the text "Contact Jon Doe." For example, user selection of the first user interface element 310 may configure the device 202 to facilitate communication with Jon Doe. By way of non-limiting example, based at least in part in response to the user selection of the first user interface element 310, the device 202 may transmit a text-based message, such as an SMS message or a radio transmission, e.g., via an RF transmitter, to a device associated with Jon Doe and/or to a machine Jon Doe may be operating, e.g., the excavator 104a. In other implementations, selection of the first user interface element 310 may cause the device 202 to attempt to make a call, e.g., a cellular call, to the device associated with Jon Doe and/or to machine proximate Jon Doe.

The second portion 308 of the event information section 302 may also include a second user interface element 312, which is illustrated as including the text "contact closest supervisor." For example, user selection of the second user interface element 312 may configure the device 202 to facilitate communication with a supervisor determined to be close to the region 212a. For example, the personnel 106b may be the closest supervisor to the excavator 104a. By way of non-limiting example, at least in part in response to the user selection of the second user interface element 312, the device 202 may transmit a text-based message, such as an SMS message or a radio transmission, e.g., via an RF transmitter, to a device associated with the supervisor and/or to a machine the supervisor may be operating. In other implementations, selection of the second user interface element 312 may cause the device 202 to attempt to make a call, e.g., a cellular call, to the device associated with the supervisor and/or to the machine proximate the supervisor. The device 202 may determine the presence and/or identity of the nearby supervisor using sensor data, e.g., sensor data from a device associated with the supervisor. For example, the supervisor may have an electronic device, e.g., a radio, a phone, a computing device, a wearable device, and/or the like that transmits its GPS coordinates and/or other location information. In other implementations, the presence of the supervisor may be determined based on facial recognition processing performed on image data captured by one or more cameras.

In some implementations, selection of the first user interface element 310 and/or of second user interface elements 312 may cause the device to further update the graphical user interface 300, for example, by providing alternate options, e.g., call, text, radio, or the like, via which Jon Doe and/or the supervisor should be contacted. An updated graphical user interface may also include a text or other content entry-tool via which the user may compose a message to be sent to Jon Doe and/or the supervisor.

As also illustrated in FIG. 3, the graphical user interface 300 may also include a third user interface element 314 that allows a user to directly interact with one or more machines, in this example, with the excavator 104a. Specifically, user selection of the third user interface element 314 may transmit a signal to the excavator 104a that causes the excavator to turn off and prohibit further use, e.g., until an override or the like is received. In other examples described herein, additional user interface elements may be provided to perform other functions to mitigate risks associated with the event.

The graphical user interface 300 may also include a fourth user interface element 316. Selection of the fourth user interface element 316 may cause the event to be ignored. For example, selection of the fourth user interface element 316 may cause the designation 220 to be removed, for example. In other implementations, selection of the fourth user interface element 216 may cause an additional designation or indicia (not shown) to be displayed on the display 204, e.g., to indicate that the event A has been investigated, but no further action is necessary at this time. In implementations described herein, the fourth user interface element 314 may cause a timer or the like to be started. In some implementation, after a predetermined amount of time, if some or all of the conditions making up the event A persist, the risk factor associated with the event A may be incrementally increased and/or the designation 220 or a new designation may be displayed in connection with the event A. Thus, some implementations may allow a user to "ignore" an event, but may all the user's attention back to the event should the underlying conditions persist.

The graphical user interface 300 may also include a fifth user interface element 318, selected to access additional options. For example, selecting the element 318 may cause still further information about the event to be displayed and/or provide the user with additional options. For example, additional options may link the user to video footage associated with the event, e.g., live or near live video footage of the portion of the worksite 100 corresponding to the region 212a.

The graphical user interface 300 may also include the user interface controls 216a, 216b, which may allow the user to investigate additional events.

According to the foregoing, the graphical user interfaces 200, 300, may allow a user, such as a supervisor, a manager, a foreman, or other personnel to readily identify and investigate potential events and selectively take action to mitigate risks. As noted above with respect to claim 1, however, in implementations of this disclosure some actions, including but not limited to the actions associated with the user interface elements 310, 312, 314 may be performed automatically in implementations of this disclosure. For example, if the risk factor associated with the region 212a meets or exceeds a threshold, e.g., a relatively high threshold representative of an imminent threat, the techniques described herein may automatically intervene in the event, e.g., by contacting Jon Doe, contacting a supervisor, and/or controlling the excavator 104a remotely. Thus, for example, if a value associated with the risk factor determined for event A reaches a first threshold, the event may be highlighted on the map 206, and the user may access a graphical user interface like the graphical user interface 300, which may facilitate causing some action to be taken. However, if the value of the risk factor exceeds a second, higher threshold, one or more of the actions may be triggered automatically, to intervene even without the user's approval.

Figure 4:
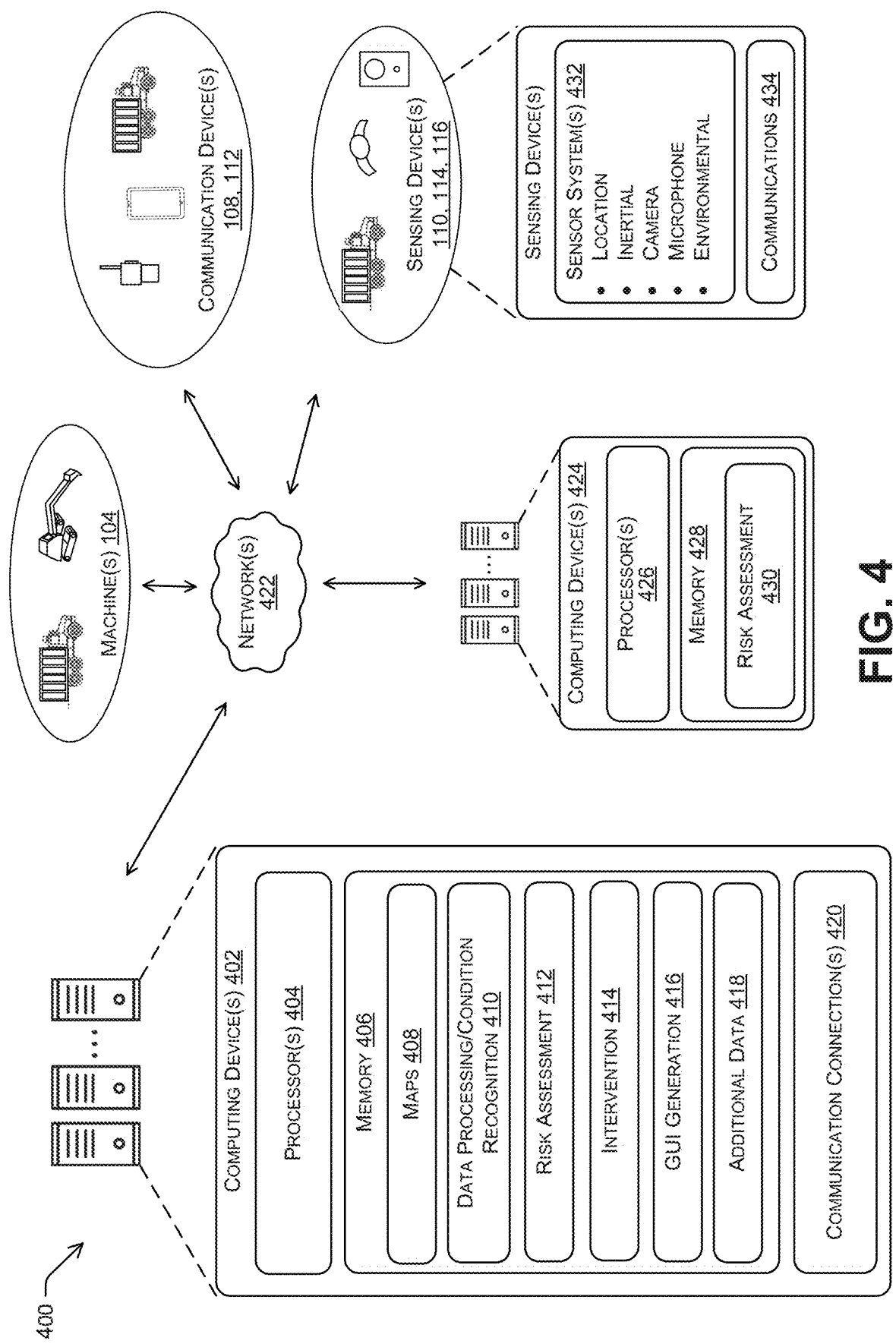
FIG. 4 is an example computing environment for automatically triggering incident intervention in accordance with an example embodiment of the present disclosure.

FIG. 4 is a block diagram illustrating an example system 400 for automatically triggering incident intervention according to examples described herein. In at least one example, the system 400 can include one or more computing device(s) 402, which may be the computing system 120 in some implementations. The computing device(s) 402 can include processor(s) 404 and memory 406 communicatively coupled with the processor(s) 404. In the illustrated example, the memory 406 of the computing device(s) 402 stores maps 408, a data processing/condition recognition system 410 (which may be or include the data processing/condition recognition component 122), a risk assessment system 412 (which may be or include the risk assessment component 124), an intervention system 414 (which may be or include the intervention component 126), and a graphical user interface (GUI) generation system 416. Although these systems and components are illustrated as, and will be described below as, separate components, functionality of the various systems may be attributed differently than discussed. Moreover, fewer or more systems and components may be utilized to perform the various functionalities described herein. Furthermore, though depicted in FIG. 4 as residing in memory 406 for illustrative purposes, it is contemplated that the maps 408, the data processing/condition recognition system 410, the risk assessment system 412, the intervention system 414, and/or the GUI generation system 416 may additionally, or alternatively, be accessible to the computing device(s) 402 (e.g., stored on, or otherwise accessible by, memory remote from the computing device(s) 402).

In some examples, the maps 408 may include maps of jobsites or worksites, such as the worksite 100. A map can be any number of data structures modeled in two dimensions or three dimensions that are capable of providing information about an environment, such as, but not limited to, topologies (such as intersections), streets, mountain ranges, roads, terrain, and the environment in general. The maps 408 may also include data structures capable of providing information about buildings, including but not limited to floorplans, blueprints, layouts, equipment models and locations of equipment, and/or other building-centric information. As noted above, while the maps 408 may be stored in the memory 406 of the computing device(s) 402, in other implementations, the maps 408 may be accessed by the computing device(s) 402, e.g., via the network 420.

In at least one example, the data processing/condition recognition system 410 (which may be or include functionality associated with the data processing/condition recognition component 122) can include functionality to receive data from the sensing device(s) 110, 114, 116 and generate information about the worksite based on the received data. For example, the data processing/condition recognition system 410 can determine a position and/or orientation of the machines 104 and/or the personnel 106 (e.g., a position in a local or global coordinate system and an orientation in that coordinate system). In some instances, the data processing/condition recognition system 410 can include and/or request/receive a map of an environment (e.g., from the maps 408) and can continuously determine a location and/or orientation of the machines 104 and/or the personnel 106 relative to the map. In some instances, the data processing/condition recognition system 410 can receive image data, LIDAR data, radar data, IMU data, GPS data, wheel encoder data, and the like to accurately determine locations of the machines 104. Moreover, the data processing/condition recognition system 410 can receive image data, GPS data, and the like to accurately determine locations of the personnel 106. By way of non-limiting example, the data processing/condition recognition system 410 may receive position information from an electronic device associated with the personnel 106, e.g., from a wearable device, a tablet, a radio, or the like. Moreover, in instances in which a machine does not include sensors indicative of its location (e.g., does not include a GPS sensor) and/or in instances in which personnel 106 does not have an associated position sensor, the data processing/condition recognition system 410 may determine positions and/or orientations of machines 104 and/or of personnel 106. For instance, the data processing/condition recognition system 410 may process image data captured by sensors at the worksite to identify a machine or person (as discussed below) and determine a position of the identified machine/person relative to other objects having known positions. For example, a camera trained on an interior of a machine may recognize an operator of the vehicle, and, although the position of the person may not be known from a device immediately associated with the person, e.g., a wearable or other electronic device associated with the operator, the location of the machine may be known from sensor data.

In some implementations, the data processing/condition recognition system 410 can also process sensor data to identify objects at the worksite. For example, sensors affixed to or otherwise associated with machines 104 or personnel 106 may transmit identification information, e.g., metadata, along with generated sensor data and the data processing/condition recognition system 410 may identify objects using this identification information. Moreover, the data processing/condition recognition system 410 may perform processing on image data generated by cameras in the worksite to determine objects. For example, the data processing/condition recognition system 410 may employ facial recognition processing on image data captured by a sensor including a camera trained on an interior of a machine to determine an identify of the machine. Other cameras, including but not limited to cameras associated with the sensors 116 may also capture images of personnel 106 at various locations in the worksite and techniques described herein may be used to determine an identify of the personnel 106. Similarly, the data processing/condition recognition system 410 may use image processing to identify other objects at the worksite 100. For example, the data processing/condition recognition system 410 may utilize edge detection and/or feature recognition techniques to identify objects and identify the object by comparing features of those objects may be compared to a feature database.

The data processing/condition recognition system 410 is not limited to determining location, position and/or identification. In implementations described herein, the data processing/condition recognition system 410 can determine any number of conditions relative to the worksite 100. For example, the data processing/condition recognition system 410 can receive sensor data from myriad types of sensors and determine one or more conditions associated with the worksite based on the sensor data. In some additional examples, the data processing/condition recognition system 410 may determine environmental conditions, e.g., temperature, air quality, ambient lighting conditions, wind speed and/or direction, precipitation information, ground quality (e.g., whether a road is passable), or the like. Moreover, the data processing/condition recognition system 410 may use sensor data received from various sensors along with the additional data 418 to determine conditions affecting the worksite. By way of non-limiting example, when a person is identified at the worksite 100, the data processing/condition recognition system 410 may access records associated with the person, e.g., to determine a skill level of the person, training the person has undertaken, or the like. Other conditions that may be of interest in applications of this disclosure may include physical information, e.g., distances between the machines 104, the personnel, and/or other objects. Some additional conditions may relate to one or more of personnel alertness, e.g., fatigue information or distraction information; presence and/or vulnerability of high energy hazards, e.g., the presence and extent of electrical energy, kinetic hazards, potential energy (stored as in hydraulics, pneumatics, gravitational, and/or mechanical), chemical and thermal energy (potential for reaction, heat, combustion) and/or radiation energy (optical, electromagnetic, ionizing, prolonged direct sun exposure); attributes of the working environment, e.g., working in isolation, confined spaces and/or congested areas, the presences of environmental hazards, unsafe or risky conditions, and/or improper and/or over-repetition of technique(s); culture of the worksite, e.g., level of overtime, schedule and productivity pressure, historical safety performance (number prior incidents), and/or safety culture of the worksite, e.g., frequency of safety inspections or meetings, information from audits and observations, tracking of near miss investigations, presence/absence of housekeeping, presence/absence in safety meetings, employee engagement in safety, presence/absence of employee perception surveys, and/or active reporting of safety-related incidents. Still further conditions may include information about safety experience, e.g., safety training level and experience, and/or supervision information; information about use of safety equipment, e.g., presence and proper use of personal protection equipment, presence and use of safety devices, hazard signage; information about work planning, e.g., dissemination of procedures, work change plans, pre-task planning, and/or presence/absence of procedures; and/or the status of equipment and tools, e.g., maintenance history, experience of equipment operator(s), the presence and use of safety controls (safety guards, barriers, curtains), equipment control, fault code histories, and/or the presence/absence of visual warnings on equipment. Other conditions may also be appreciated by those having ordinary skill in the art based on this disclosure.

In some instances, the risk assessment system 412 (which may be or include functionality associated with the risk assessment component 124) can include functionality to quantify a risk level or risk factor associated with the conditions identified by the data processing/condition recognition system 410. For instance, the risk assessment system 412 may determine all conditions affecting a region or geographic area of the worksite 100 and determine a risk factor associated with that combination of conditions. By considering the combination of conditions occurring at substantially the same time and at substantially the same location, as opposed to individual conditions in isolation, the risk assessment system 412 may better identify precursors to safety incidents, e.g., accidents or machine failure. In some examples, the risk assessment system 412 may compare conditions in a region to a database of condition combinations, e.g., stored as the additional data 418 to determine a value of the risk factor. As discussed above in the example of FIGS. 1-3, while each individual condition at the region 212a may be low risk (or even insignificant) on its own, the combination of multiple conditions may increase the risk at the region, sometimes to a critical level that warrants intervention.

The risk assessment system 412 may utilize data about previous incidents to recognize combinations of conditions that may result in incidents. By way of non-limiting example, the risk assessment system 412 may determine the risk factors using an algorithm or function trained on previous incidents (e.g., historical incidents). Aspects of this disclosure may recognize that many sensor modalities have existed at worksites in the past, but data from such sensors may be used only to review incidents, e.g. to prepare insurance claims or the like. Such data has not been systematically used to predict future incidents. By considering previous incidents, and more specifically, conditions that existed at the time of, or at a time leading up to, such incidents, patterns may emerge that could prove useful to identify incidents before they happen. Implementations of this disclosure may utilize such information to quantify risk and/or automatically intervene to mitigate such risk.

In some examples, the intervention system 414 (which may be or include functionality associated with the intervention component 126) can include functionality to intervene to prevent events, e.g., based on the risk factor determined by the risk assessment system 412. In some examples, upon determining that a value of a risk factor is equal to or exceeds a threshold value, the intervention system may act to mitigate the risk. Using the example of FIGS. 1-3, if the intervention system 414 determines that a risk factor associated with the region 212a, i.e., associated with the event A, is equal to or greater than a threshold risk, the intervention system 414 may immobilize the excavator 104a, thereby shutting down the excavator and mitigating the risk. Alternatively, the intervention system 414 may control the machine, e.g., the excavator 104a, to limit functionality. For example, the intervention system 414 may control the excavator 104a to limit use of the excavator 104a to movement of the articulated arm and bucket, e.g., while configuring the excavator 104a to prohibit movement of tracks or wheels of the excavator. In other examples, the intervention system 414 may determine a virtual boundary around the excavator 104a, e.g., within which the excavator 104a may be controlled to move freely. The intervention system 414 may also control other machines, e.g., the trucks 104b-104d, to prohibit those machines from proceeding beyond the virtual boundary. Thus, in these examples, while Jon Doe may have use or limited use of the excavator 104a, the intervention system 414 may automatically institute additional safety precautions to mitigate the risk.

In other examples, the intervention system 414 may also or alternatively alert Jon Doe to the hazardous condition, e.g. by transmitting a message to a device associated with Jon Doe and/or to the excavator 104a, by causing an audible output at or proximate the excavator, or the like. In still further examples, the intervention system 414 may contact a supervisor or other personnel, e.g., the personnel 106b, with instructions to report to the location depicted by the region 212a to oversee Jon Doe and/or to otherwise interact with Jon Doe. Accordingly, in examples described herein, when a confluence of conditions suggests an event that may result in harm to a person, machine and/or the worksite, the intervention system 414 may automatically take action to control a machine and/or alert personnel to mitigate the risk.

In some examples, the graphical user interface generation system 416 can include functionality to generate one or more interactive interfaces, such as the graphical user interfaces 200, 300 for presentation on a display. In some examples, the GUI generation system may receive information from the maps 408, the data processing/condition recognition system 410, the risk assessment system 412, the intervention system 414, and/or the additional data for 18 to generate the GUIs. By way of nonlimiting example, the GUI generation system 416 may use the maps 408 and data generated by the risk assessment system 412 two create the GUI 200 showing the values of the risk factors on the map of the worksite 100. Moreover, the GUI generation system 416 may receive information about conditions, such as information about the presence of an excavator at the worksite, and may configure the GUIs to include graphical representations of such objects. As described above with reference to FIG. 2 and three, GUIs may provide interactive elements, such as user interface elements that allow for interaction by a user with the GUIs. In the example GUI 300 of FIG. 3, information in the first portion 304 may be information determined by the data processing/condition recognition system 410 and the user interface controls 310, 312, 314 may be generated based at least in part on information from the intervention system 414. The GUI generation system 416 may also access templates, logic, APIs, plug-ins, and/or other software, firmware, or data necessary to render the GUIs.

The computing device(s) 402 may also include communication connection(s) 420 that enable communication between the computing device(s) 402 and other local or remote device(s). For instance, the communication connection(s) 420 can facilitate communication with other computing device such as the computing device(s) 424, the machines 104, the communication devices 108, 112, the sensing devices 110, 114, 116, and/or one or more networks, such as the network(s) 422. For example, the communications connection(s) 420 can enable Wi-Fi-based communication such as via frequencies defined by the IEEE 802.11 standards, short range wireless frequencies such as BLUETOOTH®, other radio transmission, or any suitable wired or wireless communications protocol that enables the respective computing device to interface with the other computing device(s).

In some implementations, the computing device(s) 402 can send information, such as sensor data, to the computing device(s) 424, via the network(s) 422. The computing device(s) 424 can receive the sensor data from the computing device(s) 402 and/or from the sensing devices 110, 114, 116 directly, and can perform some of the functions attributed to the computing device(s) 402. In at least one example, the computing device(s) 424 can include processor(s) 426 and memory 428 communicatively coupled with the processor(s) 426. In the illustrated example, the memory 428 of the computing device(s) 424 stores a risk assessment component 430.

The risk assessment component 430 may correspond to the risk assessment system 412 described above. For example, include functionality to quantify a risk level or risk factor associated with the conditions identified by the data processing/condition recognition system 410. For instance, the risk assessment system 412 may determine all conditions affecting a region or geographic area of the worksite 100 and determine a risk factor associated with that combination of conditions. By considering the combination of conditions occurring at substantially the same time and at the same location, as opposed to individual conditions in isolation, the risk assessment system 412 may better identify precursors to safety incidents, e.g., accidents or machine failure. In some examples, the risk assessment system 412 may compare conditions in a region to a database of condition combinations, e.g., stored as the additional data 418 to determine a value of the risk factor. As discussed above in the example of FIGS. 1-3, while each individual condition at the region 212a may be low risk (or even insignificant) on its own, the combination of multiple conditions may increase the risk at the region, sometimes to a critical level that warrants intervention.

The risk assessment system 412 may utilize data about previous incidents to recognize combinations of conditions that may result in incidents. By way of non-limiting example, the risk assessment system 412 may also include a machine learning component, as discussed above.

The processor(s) 404 of the computing device(s) 402 and the processor(s) 426 of the computing device(s) 424 can be any suitable processor capable of executing instructions to process data and perform operations as described herein. By way of example and not limitation, the processor(s) 404 and 426 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 406 and memory 428 are examples of non-transitory computer-readable media. Memory 406, 428 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As also illustrated in FIG. 4, the computing device(s) 402 may also communicate with the machines 104, the communication devices 108, 112, the sensing components 110, 114, and/or the sensors 116. Although the computing device(s) 402 are illustrated as communicating with such machines and devices via the network(s) 422, in other implementations, the computing devices 402 may be in direct communication with the machines and/or devices. Similarly, the machines 104, the communication devices 108, 112, the sensing components 110, 114, and/or the sensors 116 may be in direct communication with the computing devices 424. As further illustrated in FIG. 4, the sensing devices (e.g., the sensing components 110, 114 and/or the sensors 116) may include one or more sensor system(s) 432. In at least one example, the sensor system(s) 432 can include location sensors (e.g., GPS, compass, etc.), inertial sensors (e.g., inertial measurement units, accelerometers, magnetometers, gyroscopes, etc.), cameras (e.g., RGB, UV, IR, intensity, depth, etc.), microphones, wheel encoders, environment sensors (e.g., temperature sensors, humidity sensors, light sensors, pressure sensors, etc.), LIDAR sensors, RADAR sensors, ultrasonic transducers, SONAR sensors, etc. The sensor system(s) 432 can include multiple instances of each of these or other types of sensors. For instance, each of the machines 104 may have multiple cameras disposed at various locations about the exterior and/or interior of the machine. The sensor system(s) 432 can provide input to the computing device(s) 402 and/or the computing device(s) 424, e.g. via a communications system 434. Additionally, and/or alternatively, the sensor system(s) 432 can send sensor data, via the communications system 434 and/or the network(s) 422, to the computing device(s) 402 and/or to the computing device(s) 424 at a particular frequency, after a lapse of a predetermined period of time, in near real-time, etc.

It should be noted that while FIG. 4 is illustrated as a distributed system, in alternative examples, components of the computing device(s) 402 can be associated with the computing device(s) 424 and/or components of the computing device(s) 424 can be associated with the computing device(s) 402. Moreover, although various systems and components are illustrated as being discrete systems, the illustrations are examples only, and more or fewer discrete systems may perform the various functions described herein.

Figure 5:
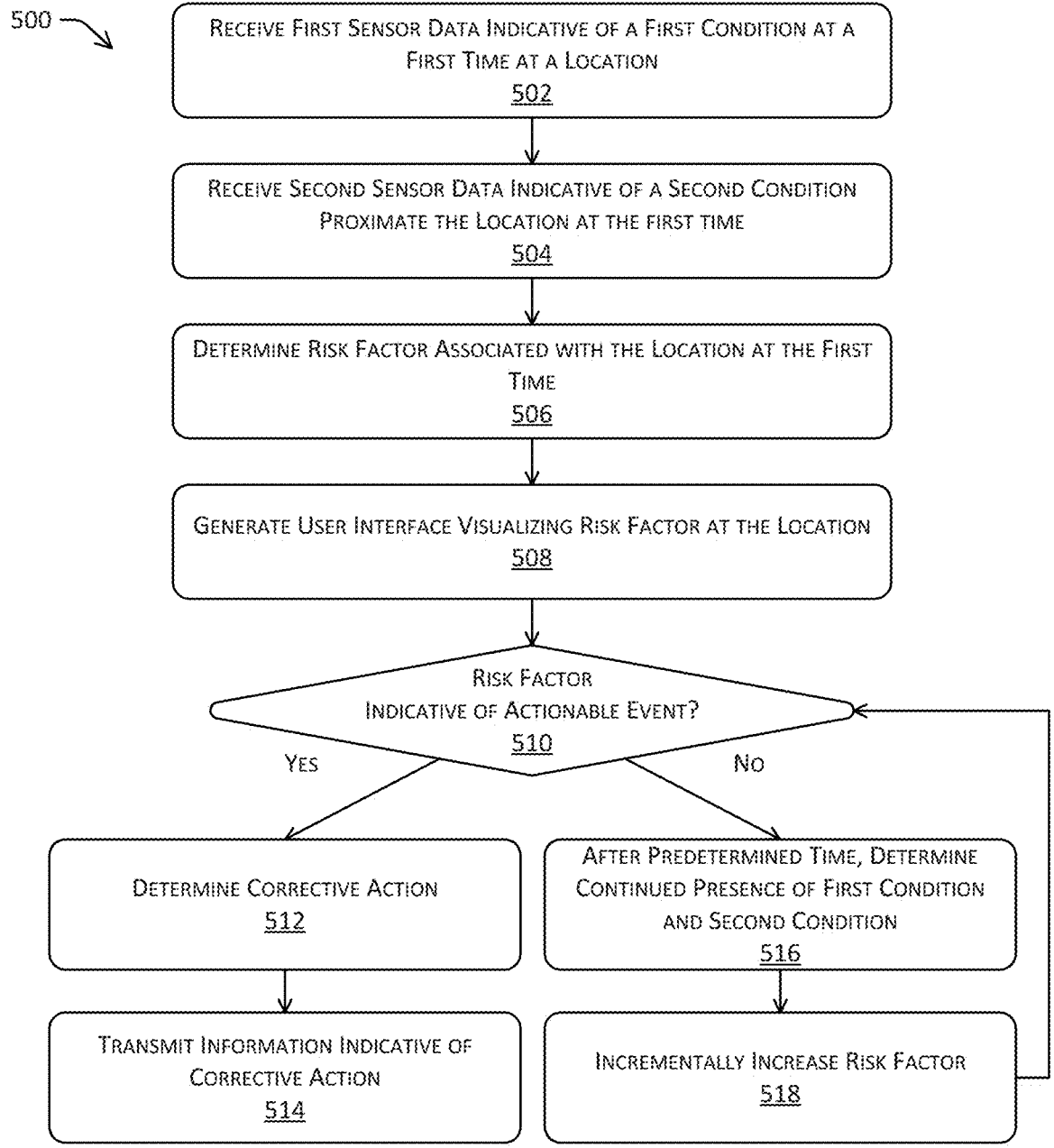
FIG. 5 is a flowchart illustrating an example method of automatically triggering incident intervention in accordance with an example embodiment of the present disclosure.
Figure 6:
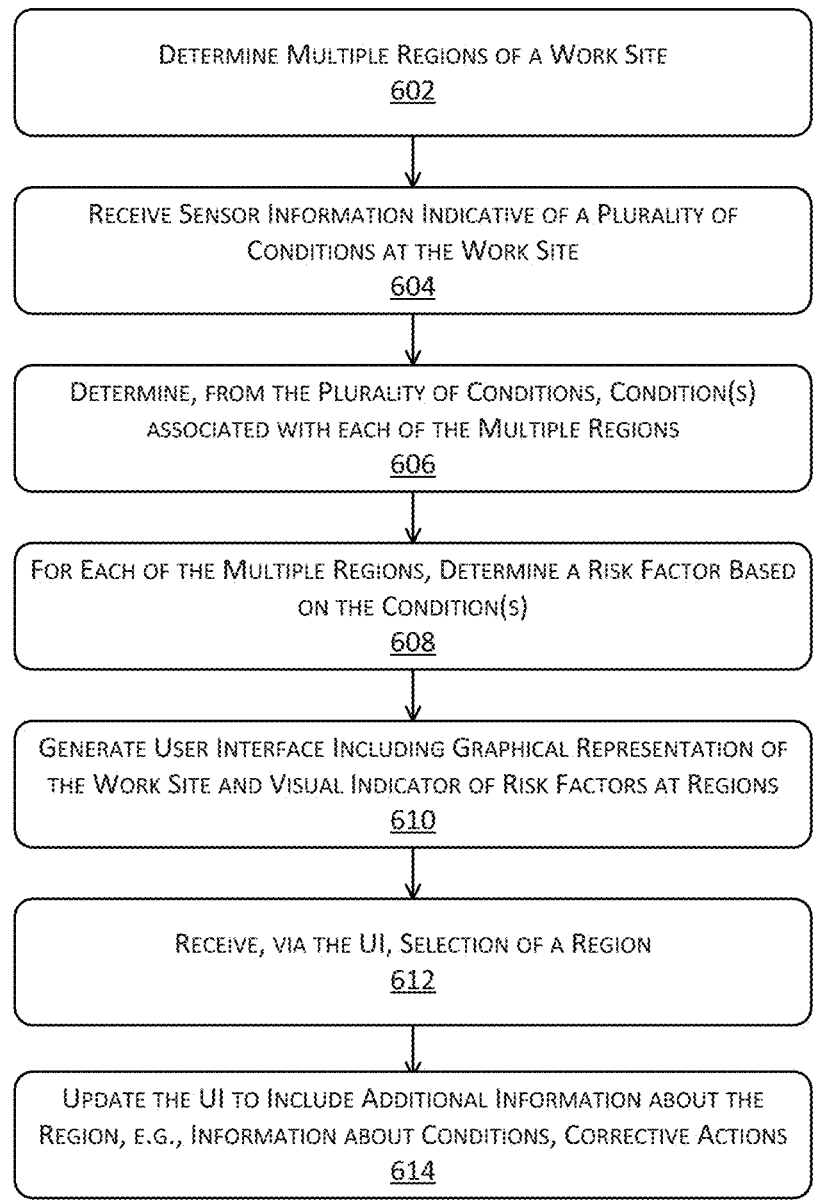
FIG. 6 is a flowchart illustrating an example method of automatically triggering incident intervention in accordance with an example embodiment of the present disclosure.
Figure 7:
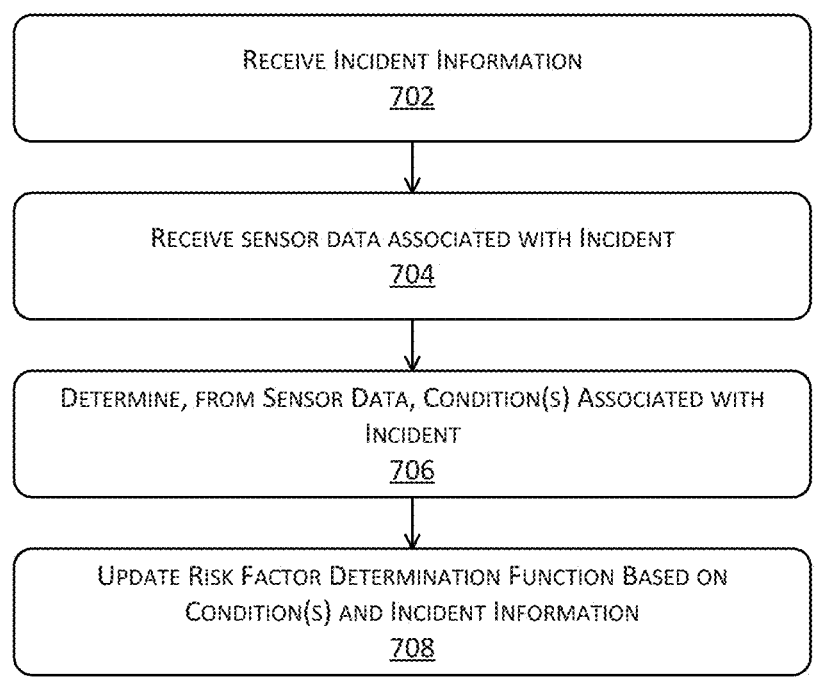
FIG. 7 is a flowchart illustrating an example method of automatically triggering incident intervention in accordance with an example embodiment of the present disclosure.

FIGS. 5-7 illustrate flow charts depicting example processes 500, 600, 700 of the present disclosure, and related to triggering incident intervention. The example processes 500, 600, 700 are illustrated as a collection of steps in a logical flow diagram, which steps represent operations that can be implemented in hardware, software, or a combination thereof. In the context of software, the steps represent computer-executable instructions stored in memory. When such instructions are executed by, for example, the processor(s) 404, such instructions may cause the controller processor(s) 404, various components of the computing device(s) 402, the computing device(s) 424, the machines 104 and/or the communication device(s) 108, 112 to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the processes 500, 600, 700, are described with reference to the worksite 100, the GUIs 200, 300, the computing system 400, and/or other items shown in FIGS. 1-4.

The process 500 is illustrated in FIG. 5 and generally describes a method of intervening in incidents. The process 500 includes, at 502, receiving first sensor data indicative of a first condition at a first time and at a location. For example, the computing device(s) 402 may receive data, e.g. via one or more signals, from one or more sensing devices, which may include the sensing device(s) 110 associated with one or more of the machines 104, the sensing device(s) 114 associated with one or more of the personnel 106 at the worksite 100, and/or the other sensing device(s) 116 located at the worksite 100. In any of the examples described herein, the data received at 502 may include position information (e.g., GPS coordinates, map information, a location name, and/or other information from which a position can be determined) indicating a location associated with the sensor data. The sensor data may also include a timestamp indicating a time (e.g., day, month, year, hour, minute, second, millisecond, etc.) at which the sensor data was generated by the corresponding sensor(s). In some implementations, the sensor data may be directly indicative of the event. For example, sensor data received from a temperature sensor may directly indicate the temperature. Moreover, GPS or other position data from a position sensor on a machine 104 or personnel 106 may sufficiently identify the presence of the machine or the person at the location.

However, in other implementations, the sensor data may be used to determine a condition at the worksite 100. For example, in some instances, the sensor data may also include video and/or image data, e.g., captured by a camera, LIDAR data, RADAR data, and/or other types of data that may be processed to determine the presence of an object and/or the location of the object. Moreover, the image data may be processed, e.g., using facial recognition techniques, to determine an identity of the detected person, to determine the condition. Other sensor data may also be received at 502 and used to determine condition(s), e.g., using the data processing/condition recognition system 410, detailed above in connection with FIG. 4.

The process 500 may also include, at 504, receiving second sensor data indicative of a second condition proximate the location at the first time. For example, and as with 502, the computing device(s) 402 may receive data, e.g. via one or more signals, from one or more sensing devices, which may include the sensing device(s) 110 associated with one or more of the machines 104, the sensing device(s) 114 associated with one or more of the personnel 106 at the worksite 100, and/or the other sensing device(s) 116 located at the worksite 100. In examples of this disclosure, the second sensor data may be received from the same or one or different sensors than the first sensor data received at 502. As with the first condition, the second condition may be determined directly from the second sensor data, or determined based at least in part on the second sensor data, e.g., using the data processing/condition recognition system for 10 detailed above.

The process 500 may also include, at 506, determining a risk factor associated with the location at the first time. As noted above, techniques described herein may quantify risk associated with multiple conditions occurring at substantially the same time and at substantially the same location. Thus, in implementations of this disclosure, the risk factor may be determined, e.g., quantified, based on the first and second conditions. In example implementations, the risk factor may be determined using the risk assessment system 412 and/or the risk assessment component 430. As detailed above, the risk factor may be a numerical risk factor, e.g., a number in a predetermined range, e.g., 0-10, 0-100, or the like. In other implementations, the risk factor may be a risk level, e.g., high, medium, or low. In still other implementations, the risk factor may be otherwise determined.

The process 500, at 508, also includes generating a user interface visualizing the risk factor at the location. For example, the techniques described herein, may generate the graphical user interface 200 which includes the map 202 illustrating risks of a worksite 102. As noted above, those areas or regions that have a higher risk factor, e.g., that may be more likely to experience incident such as an accident, may be readily apparent from the map 206. For example, the map 206 may be a heat map with relatively quote hotter" areas indicating high-risk areas and relatively quote cooler" areas representing less likelihood of an incident. As detailed above, the graphical user interface 200 may also include user interface elements 214, 216, 218, via which a user, such as a supervisor or the like, reviewing the map 206 may obtain additional information about, and/or act on, those regions that have higher risk factors.

The process 500 also includes, at 510, determining whether the risk factors indicative of an actionable event. For example, the techniques described herein may determine whether a risk factor associated with the location has a value that is equal to or above a threshold value. In other examples of this disclosure, it may be determined that the risk factor is indicative of an actionable event upon a user interaction with the user interface generated at 508. As detailed above in connection with FIG. 3, the graphical user interface 300 may include user interface elements that allow one or more actions to be taken to mitigate conditions and/or events.

If it is determined, at 510, that the risk factor at the location is indicative of an actionable event, the process includes, at 512, determining a corrective action. For example, the techniques described herein may determine that the risk may be mitigated by overriding controls of a machine at the location, e.g., to shut the machine down, by contacting personnel 106 proximate the location, e.g., to instruct the personnel to take corrective action, to limit machine capabilities proximate the location, e.g. by creating a safety region around a first machine and controlling the first machine to stay within the safety region and/or controlling other machines to refrain from entering the safety region. As detailed throughout this disclosure, a number of different corrective actions may be taken to mitigate risks associated with the determined events. Such actions may be dependent on the type of the worksite 100, e.g., mining versus factory, the potential damage associated with the risk factor, e.g., harm to humans versus machines or the worksite, or other factors.

The process also includes, at 514, transmitting information indicative of the corrective action. For example, when it is determined that the corrective action must be taken immediately and includes controlling a machine, the computing device(s) 402 may send the signal, e.g., via the communication connections 420, to override or otherwise take control of the machines 104. In other examples, the action may include transmitting a message, such as a text-based, or audio-based message to a device associated with a machine for, e.g., a speaker in a cab of the machine 104, or associated with personnel, such as via a radio or other electronic device.

If, however, it is determined at 510 that the determined risk factor is not indicative of an actionable event, e.g., because the risk factor is not equal to or above a threshold value and/or a user has chosen to take no action relative to the risk factor, the process 500 may include, at 516, after a predetermined time, determining a continued presence of the first condition and the second condition. For example, sensor data like the first sensor data and/or the second sensor data, may continue to be received after the first time and such additional data may continue to be processed and or monitored to determine that the first condition and the second condition persist.

The process 500 may also include, at 518, incrementally increasing the risk factor. For example, in implementations of this disclosure, should an elevated risk factor be allowed to persist, a value associated with the risk factor may be increased over time. Thus, for example, should a supervisor or other person overseeing the worksite continue to ignore potentially problematic situation, e.g., as indicated by a plurality of conditions occurring at the same time and place, a value of a risk factor associated with that situation may continue to be increased. From 518, the process may return to 510, at which it is determined whether the risk factor is indicative of an actionable event. As will be appreciated and, as the potentially problematic situation continues to go ignored, a risk factor associated with the situation will increase, until eventually the process 500 will take action to mitigate the risk.

FIG. 6 illustrates the process 600. More specifically, the process 600 may describe techniques for generating and updating a user interface, such as the GUIs 200, 300 that allow a user, such as a supervisor or the like, to monitor a worksite, such as the worksite 100, and selectively intervene to mitigate risks. More specifically, at 602, the process 600 includes determining multiple regions of the worksite 100. For example, the techniques described herein may determine the regions 212 illustrated in FIG. 2. Each of the regions 212 may have a similar or the same surface area. In some instances, the size of each of the regions 212 may be determined by the size of the worksite. For example, the number of regions 212 may be predetermined regardless of the size of the worksite, in which case the regions will be relatively larger for a relatively smaller work site and relatively smaller for a larger worksite. In still further implementations, the size of the regions may be dynamically adjusted, e.g., according to a number of objects detected in a region. Using the worksite 100 as an example, more and/or smaller regions may be determined in and/or proximate the open-pit mine 102 whereas fewer and/or larger regions may be used at or about a periphery of the worksite 100.

The process 600, may also include, at 604, receiving sensor information indicative of a plurality of conditions at the worksite. For example, the sensor information received at 604 may be from any of the sensing devices 110 associated with the machines 104, the sensing devices 114 associated with the personnel 106, the additional sensing devices 116, and/or the sensor systems 432. Moreover, the sensor information received at 604 may be the same as the first sensor data and/or the second sensor data received at 502 and 504, respectively. Sensor modalities and types of sensor data are discussed throughout this disclosure.

The process 600 may also include, at 606, determining from the plurality of conditions, conditions associated with each of the multiple regions. For example, location data for each of the plurality of conditions may be determined based on locations of the sensors, via image processing techniques, and/or in other ways.

The process 600 may also include, at 608, determining, for each of the multiple regions, a risk factor based on the condition(s). As noted above, techniques described herein may quantify risk associated with multiple conditions occurring at substantially the same time and at substantially the same location. Thus, in implementations of this disclosure, the risk factor may be determined, e.g., quantified, for each region, based on the conditions existing in that region. In example implementations, the risk factor may be determined using the risk assessment system 412 and/or the risk assessment component 430. As detailed above, the risk factor may have a numerical value, e.g., a number in a predetermined range, e.g., 0-10, 0-100, or the like. In other implementations, the risk factor may be a risk level, e.g., high, medium, or low. In still other implementations, the risk factor may be otherwise quantified.

The process 600 may also include, at 610, generating a user interface including graphical representation of the worksite and visual indicators of the risk factors at the regions. For example, the techniques described herein may generate the map 202 on the GUI 200 illustrated in FIG. 2. As illustrated in FIG. 2, each of the regions, e.g., the regions determined at 602, can be separately indicated by a color or other designation indicative of a value of the risk factor determined at 608. In implementations of this disclosure, the user interface may provide a user, such as a supervisor of the worksite 100, a graphical illustration of the worksite as well as risks associated with the site at any given time. The graphical user interface may be updated in real time, or in near-real time, to keep the supervisor up to date at all times about the goings-on at the worksite 100 and to provide the supervisor with tools to investigate aspects of the worksite in more detail.

The process 600 may also include, at 612, receiving, via the user interface, selection of a region. For example, the supervisor described may desire to receive additional information about a region indicated as having a relatively higher risk factor. As illustrated in FIG. 2, and discussed above in connection with that figure, the user may select a region of interest by selecting the region on the map 202, by selecting one of the user interface elements 214, 216, 218 corresponding to a region, and/or by selecting a graphical indicator, such as the designation 220, associated with the region or with the risk factor.

The process 600 may also include, at 614, updating the user interface to include additional information about the region. This additional information may include information about the conditions, about corrective actions for mitigating risk at the region, or the like. For example, FIG. 3 illustrates a GUI 300 displayed in response to a user selection of a user interface element associated with the event A. As illustrated in FIG. 3, and discussed in detail above, the additional information may include a first portion 304 that includes information about the conditions present in the region, and the additional information may also include a second portion 308 that provides recommended actions for mitigating the risk, and/or provides interactive controls, such as the user interface elements 310, 312, 314 for taking action relative to the conditions.

FIG. 7 illustrates the process 700. The process 700 may illustrate techniques for determining a risk factor determination function. For example, the process 700 may be used to determine groups of conditions, e.g., indicators, that may signal an event. Techniques described herein use sensor data from multiple sensors to determine conditions, and based on the proximity in time and location of those conditions, determine a risk value for regions of a worksite. The risk value may be based on a risk assessment model, e.g., executed by the risk assessment system 412, and the risk assessment model may be informed by incidents, e.g., accidents at the worksite.

More specifically, the process 700 may include, at 702, receiving incident information. For example, information about a reported incident, e.g., an accident, injury, machine failure, or the like may be input to the computing device(s) 402. For example, a supervisor, a foreman or other personnel may input information about an incident including a time, location, and outcome, e.g., resulting damage, injuries, or the like, pertaining to the incident.

The process may also include, at 704, receiving sensor data associated with the incident. For example, and as noted above, a time and a location associated with the incident may be known, e.g., from an incident report, and data from one or more sensors, including but not limited to the sensing device(s) 110 associated with the machines 104, the sensing devices 114 associated with the personnel 106, the additional sensing device(s) 116, and/or the sensor system(s) 432 may be retrieved for the time and/or location of the incident. In some examples, the sensor data may be data captured for a period of time before the incident, e.g., seconds, minutes, or hours before the incident.

The process 700 may also include, at 706, determining conditions associated with the incident. For example, the data processing/condition recognition system 410 may process the sensor data received at 704 to determine one or more conditions at the location of the incident contemporaneously with, or preceding, the incident. Accordingly, at 706, the process 700 may determine the status of the location leading up to the incident.

The process 700 may also include, at 708, updating a risk factor determination function based at least in part on the condition(s) and/or the incident information. For example, at 708, information about an incident, e.g., information about conditions in place at the location of the information, may be used to train the risk assessment system 412 and/or the risk assessment component 430. In implementations of this disclosure, determining the risk factor may be done using a machine-learned model trained on information about prior incidents. Moreover, as additional incidents occur at the worksite 100 (or at other worksites), the model may be updated. In one example, while the map 202 may show the highest risk factors at regions 212a, 212b, 212c, an incident, e.g., an accident, machine failure, or the like may occur in a different region; perhaps a region that was not indicated as having a high risk factor. The process 700 may use information about such an incident to train the model further, e.g., such that the conditions present at the time of or leading up to the time of the incident may result in a higher risk factor when later identified as occurring simultaneously.

INDUSTRIAL APPLICABILITY

The present disclosure provides systems and methods for identifying conditions affecting a worksite 100, and taking actions to mitigate risks, e.g., by controlling machines 104 and/or personnel 106. Such systems and methods may be used to more efficiently coordinate activities of the machines 104 and/or the personnel 106 during operations at the worksite 100. For example, such systems and methods may enable a computing system 120 to determine attributes of the worksite 100 with greater confidence and maintain incident-free operation at the worksite. As a result, the computing system may coordinate operations to be performed with improved accuracy, and thus, may maximize efficiency at the worksite 100. Additionally, such systems and methods may be used to more accurately manage the operation of the machines at the worksite 100, thereby reducing operating costs.

As noted above with respect to FIGS. 1-7, example processing of identifying risks at a worksite 100 may include receiving sensor data from one or more sensing devices 110, 114, 116. In some examples, the sensor data may provide information about a condition at a location of the worksite, e.g., an ambient temperature, a position of a machine 104 or of personnel 106, the status of safety equipment associated with the machine 104 and/or the personnel 106. Using the sensor data, the techniques described herein may determine multiple conditions within close proximity of each other, e.g., with a region 212, of the worksite 100.

The region 212 may be a predetermined area of the worksite 100. Based on the conditions determined for the region, a risk factor or risk score may be determined for the region. The risk factor may be determined by a model, such as a machine-learning model trained on information about previous incidents.

The process may also include taking one or more actions to mitigate one or more of the conditions, thereby reducing the risk factor. By way of non-limiting example, techniques described herein may cause the computing system 120 to control a machine 104 to shut down when a value of the risk factor is equal to or exceeds a threshold. In other implementations, the computing system 120 may transmit a message or the like to personnel 106 at the worksite, with instructions for mitigating the risk.

In addition to controlling the machines 104, techniques described herein may also generate and/or update a graphical user interface 200, 300, which may include a map 202 of the worksite 100. The map 202 may include visual indicia of the risk factors. By way of non-limiting example, the risk factors may be While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method comprising:
   receiving, by one or more devices, first data captured by a first sensor at a worksite,
      the first data being indicative of a first condition at a location at the worksite at a time and the first sensor being disposed on a machine performing a task at the worksite;
   receiving, by the one or more devices, second data captured by a second sensor at the worksite,
      the second data being indicative of a second condition proximate to the location at the time;
   determining, by the one or more devices and based at least in part on the first data and the second data, a risk factor associated with the location using a machine-learning model that identifies likelihoods of incidents based on information regarding previous incidents;
   causing, by the one or more devices, a first graphical user interface to be displayed,
      the first graphical user interface comprising a graphical representation of the worksite, a visual indication of the risk factor at a position on the graphical representation, the position corresponding to the location at the worksite, and a first user interface element associated with at least one of the risk factor or the location;
   receiving, by the one or more devices, an input indicative of a selection of the first user interface element;
   generating, by the one or more devices and based at least in part on the input, a second graphical user interface,
      the second graphical user interface comprising additional information about the at least one of the risk factor or the location, and
      the additional information including a second user interface element associated with overriding controls of the machine or controlling one or more other machines; and
   transmitting, by the one or more devices and based on the risk factor, a control signal that overrides the controls of the machine or controls the one or more other machines to maintain incident-free operation at the worksite.

2. The method of claim 1, further comprising:
   receiving third sensor data captured by one or more additional sensors at the worksite,
      the third sensor data being indicative of one more conditions at one or more additional locations at the worksite; and
   based at least in part on the third sensor data, determining one or more additional risk factors associated with the one or more additional locations,
      the first graphical user interface further comprising one or more visual indications of the one or more additional risk factors at one or more positions on the graphical representation, and
      the one or more additional positions corresponding to the one or more additional locations at the worksite.

3. The method of claim 1, wherein:
   the risk factor is a first risk factor having a first value,
   a second risk factor associated with only the first condition has a second value less than the first value,
   a third risk factor associated with only the second condition has a third value less than the first value, and
   the first value is greater than a sum of the second value and the third value.

4. The method of claim 1,
   wherein the risk factor is determined based at least in part on data associated with an incident of the previous incidents,
   wherein the first condition or the second condition has a first characteristic, and
   wherein the incident has a second characteristic matching the first characteristic.

5. The method of claim 1, wherein at least one of the first condition or the second condition comprises at least one of:
   a presence of a person;
   a condition of the person;
   a presence of a machine;
   a condition of the machine; or
   an environmental condition.

6. The method of claim 1, wherein overriding the controls of the machine comprises at least one of controlling the machine to stop functioning or controlling the machine to limit functionality of the machine.

7. The method of claim 1, further comprising:
   sending a message to a device associated with the location.

8. The method of claim 1,
   wherein the machine-learning model comprises a neural network, and wherein the machine-learning model identifies the likelihoods of incidents further based on conditions preceding the previous incidents.

9. A system, comprising:
a memory; and
one or more processors configured to:
receive first data captured by a first sensor at a geographic area,
the first data being indicative of a first condition at a location at the geographic area at a time;
receive second data about the geographic area,
the second data being indicative of a second condition proximate to the location substantially at the time;
generate, in real time or near-real time and based at least in part on the first data and the second data, a risk factor, associated with the location, using a machine-learning model that identifies likelihoods of incidents based on information regarding previous incidents; and
cause a dynamic display of a graphical user interface,
the graphical user interface being updated in real time or near-real time, and
the graphical user interface comprising:
a graphical representation of the geographic area comprising one or more selectable regions,
a selectable region of the one or more selectable regions corresponding to the location,
a visual indication of a value associated with the risk factor at a position on the graphical representation corresponding to the selectable region, and
a user interface element associated with the region,
the user interface element being selectable to provide additional information about at least one of the first condition or the second condition.

10. The system of claim 9, wherein the one or more processors are further configured to:
increase, based on the first condition and the second condition persisting for a predetermined amount of time after the time, the value associated with the risk factor to obtain a new value; and
updating the visual indication of the value associated with the risk factor based at least in part on the new value.

11. The system of claim 10, wherein the value associated with the risk factor is increased further based on determining that the value is equal to or above a threshold risk value.

12. The system of claim 9, wherein the one or more processors are further configured to:
send, based at least in part on the value associated with the risk factor the risk factor being equal to or above a threshold value, an instruction to a machine proximate to the location.

13. The system of claim 12, wherein the one or more processors are further configured to:
transmit a control signal that ceases operation of the machine or inhibits one or more functions of the machine.

14. The system of claim 9,
wherein the graphical user interface comprises a first graphical user interface,
wherein the user interface element comprises a first user interface element, and
wherein the one or more processors are further configured to:

receive a first user input indicative of a user selection of the first user interface element;
generate, based at least in part on information about the user selection, a second graphical user interface providing additional information about at least one of the risk factor or the location,
the additional information including a second user interface element associated with an action for mitigating a risk associated with the risk factor;
receive a second user input indicative of a user selection of the second user interface element; and
cause, based at least in part on the second user input, the action to be performed.

15. The system of claim 9, wherein, when generating the risk factor associated with the location, the one or more processors are configured to:
determine a first risk factor associated with the first condition;
determine a second risk factor associated with the second condition; and
determine the risk factor as a function of the first risk factor and the second risk factor.

16. The system of claim 9,
wherein the risk factor is generated further based at least in part on data associated with an incident of the previous incidents, and
wherein the incident has a characteristic matching a characteristic of the first condition or the second condition.

17. A system, comprising:
a memory; and
one or more processors configured to:
receive, in real time or near-real time, sensor data associated with a worksite;
determine, based at least in part on the sensor data, a first condition associated with a location at the worksite;
determine, based at least in part on the sensor data, a second condition proximate to the location;
determine, based at least in part on one or more of the first condition or the second condition, a risk factor associated with the worksite using a machine-learning model that identifies likelihoods of incidents based on information regarding previous incidents
cause dynamic display of a graphical user interface on a display of a user device,
the graphical user interface comprising:
a graphical representation of the worksite comprising a plurality of selectable regions,
a first selectable region of the plurality of selectable regions corresponding to a first portion of the worksite, and
a second selectable region of the plurality of selectable regions corresponding to a second portion of the worksite,
a visual indication of a value indicative of the risk factor positioned at the first selectable region
a first user interface element associated with the first selectable region, and
a second user interface element associated with the second selectable region; and
cause, based on a selection of the first user interface element, an updated graphical user interface including information about at least one of the first condition or the second condition.

18. The system of claim 17,
wherein the updated graphical user interface comprises a third user interface element associated with an action for mitigating a risk associated with the first risk factor, and
wherein the one or more processors are further configured to:
  receive selection information indicative of a selection of the third user interface element; and
  cause, based at least in part on the second selection information, the action to be performed.

19. The system of claim 17,
wherein the graphical user interface comprises a heat map, and
wherein the visual indication of the risk factor and a visual indication of a different risk factor are represented on the heat map.

20. The system of claim 17, wherein, when determining the risk factor, the one or more processors are configured to:
  determine a first risk factor associated with the first condition;
  determine a second risk factor associated with the second condition; and
  determine the risk factor as a function of the first risk factor and the second risk factor.

* * * * *